US008640073B2

(12) United States Patent
Chetput et al.

(10) Patent No.: US 8,640,073 B2
(45) Date of Patent: Jan. 28, 2014

(54) ANALOG/DIGITAL PARTITIONING OF CIRCUIT DESIGNS FOR SIMULATION

(71) Applicant: Cadence Design Systems, Inc., San Jose, CA (US)

(72) Inventors: Chandrashekar L. Chetput, San Jose, CA (US); Abhijeet Kolpekwar, Austin, TX (US); Iyengar Srinivasan, Round Rock, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/898,007

(22) Filed: May 20, 2013

(65) Prior Publication Data

US 2013/0326440 A1    Dec. 5, 2013

Related U.S. Application Data

(62) Division of application No. 12/873,162, filed on Aug. 31, 2010, now Pat. No. 8,448,116, which is a division of application No. 11/699,881, filed on Jan. 29, 2007, now Pat. No. 7,797,659.

(51) Int. Cl.
  *G06F 17/50*  (2006.01)
(52) U.S. Cl.
  USPC ............................ 716/132; 716/104; 716/105
(58) Field of Classification Search
  USPC ......................................... 716/104, 105, 132
  See application file for complete search history.

(56) References Cited

U.S. PATENT DOCUMENTS

| 5,809,286 | A | 9/1998 | McLain, Jr. et al. |
| 6,986,113 | B2 | 1/2006 | Sinha et al. |
| 7,102,391 | B1 * | 9/2006 | Sun et al. .................. 327/10 |
| 7,260,792 | B2 | 8/2007 | Chetput et al. |
| 7,797,659 | B2 | 9/2010 | Chetput et al. |
| 8,448,116 | B2 | 5/2013 | Chetput |
| 2008/0184181 | A1 | 7/2008 | Chetput et al. |
| 2010/0333050 | A1 | 12/2010 | Chetput et al. |

OTHER PUBLICATIONS

"U.S. Appl. No. 11/699,881, 312 Amendment filed Jul. 23, 2010", 5 pgs.
"U.S. Appl. No. 11/699,881, Non Final Office Action mailed Oct. 7, 2009", 7 pgs.
"U.S. Appl. No. 11/699,881, Notice of Allowance mailed Apr. 23, 2010", 6 pgs.
"U.S. Appl. No. 11/699,881, PTO Response to 312 Amendment mailed Aug. 16, 2010", 2 pgs.

(Continued)

*Primary Examiner* — Thuan Do
(74) *Attorney, Agent, or Firm* — Kenyon & Kenyon LLP

(57) ABSTRACT

For increasing user control and insight into preparing a mixed semiconductor design specification for simulation, there are provided methods responsive to commands that provide control over resolution of disciplines and partitioning of the design into analog and digital portions. In some aspects, the methods provide block-based assignments of disciplines, as well as design partitioning. In other aspects, the methods provide for resolving a discipline to apply in a block from among multiple possible disciplines. In some aspects, error flagging may be available for detecting disciplines different from what provided for assignment in a block. Assignments may be indicated based on instance, cell, terminal, or library names and may be specified with wild cards. In still other aspects, the methods may be embodied by instructions on computer readable media, and in systems comprising general and special purpose computer hardware that may communicate with various storage facilities and over various networks.

6 Claims, 9 Drawing Sheets

(56) References Cited

OTHER PUBLICATIONS

"U.S. Appl. No. 11/699,881, Response filed Jan. 7, 2010 to Non Final Office Action mailed Oct. 7, 2009", 11 pgs.

"U.S. Appl. No. 11/699,881, Response filed Jul. 6, 2009 to Restriction Requirement mailed Jun. 5, 2009", 10 pgs.

"U.S. Appl. No. 11/699,881, Restriction Requirement mailed Jun. 5, 2009", 5 pgs.

"U.S. Appl. No. 12/873,162, Examiner Interview Summary mailed Nov. 14, 2012", 3 pgs.

"U.S. Appl. No. 12/873,162, Non Final Office Action mailed Aug. 8, 2012", 8 pgs.

"U.S. Appl. No. 12/873,162, Notice of Allowance mailed Jan. 23, 2013", 5 pgs.

"U.S. Appl. No. 12/873,162, Preliminary Amendment filed Aug. 31, 2010", 5 pgs.

"U.S. Appl. No. 12/873,162, Response filed Nov. 9, 2012 to Non Final Office Action mailed Aug. 8, 2012", 8 pgs.

"Verilog-AMS Language Reference Manual: Analog & Mixed-Signal Extensions to Verilog HDL", version 2.2, Accellera International Inc., Available at http://www.eda.org/verilog-ams/htmlpages/public-docs/lrm/2.2/AMS-LRM-2-2.pdf, last visited on Jan. 8, 2008, (Nov. 2004).

* cited by examiner

ANALOG/DIGITAL PARTITIONING OF CIRCUIT DESIGNS FOR SIMULATION

CROSS-REFERENCE TO RELATED APPLICATIONS

This application is a divisional of and claims the benefit of priority under 35 U.S.C. §120 to U.S. patent application Ser. No. 12/873,162, entitled "ANALOG/DIGITAL PARTITIONING OF CIRCUIT DESIGNS FOR SIMULATION," filed on Aug. 31, 2010, which claims the benefit of priority under 35 U.S.C. §120 to U.S. patent application Ser. No. 11/699,881, entitled "ANALOG/DIGITAL PARTITIONING OF CIRCUIT DESIGNS FOR SIMULATION," filed on Jan. 29, 2007, which are hereby incorporated by reference herein in their entirety.

BACKGROUND

1. Field

The present invention relates generally to mixed signal simulation and verification systems, and more particularly to preparing a mixed signal design for simulation or verification.

2. Description of Related Art

Digital designers have worked for years with digital description languages, such as VHDL and Verilog. Likewise, analog designers have worked for many years with analog description languages, such as SPICE. More recently, due to the increasing need for mixed-signal Computer Aided Design (CAD) tools, mixed signal versions of simulation tools have become more prevalent. For example, mixed signal versions of Verilog and VHDL presently exist, which enable simulation of portions of a design with either or both of analog and digital simulation tools.

These mixed-signal description languages and associated simulation tools provide for simulating portions of a design as logic or as an analog circuitry. For example, Verilog-AMS provides the concepts of a domain and a discipline that may be assigned to interconnects (nets). In Verilog-AMS, the domain may either be analog or digital (i.e., continuous or discrete), and determines whether a given net is to be simulated using a digital simulation tool or an analog simulation tool. Disciplines, in addition to specifying a domain, may include other attributes, for example, measurement units for voltage levels. Thus, assigning a discipline to a net also defines a domain for the net, and thereby determines whether that net should be simulated as an analog or a digital net. After nets are assigned disciplines, it is possible to define digital/analog partitions using automated algorithms, wherein digital islands comprise interconnected nets that have been assigned a digital discipline, and analog islands comprise interconnected nets that have been assigned an analog discipline.

In Verilog-AMS, to demarcate such partitions before simulation, a transition between an analog island and a digital island is marked by a Connection Module (CM). In addition to bridging analog and digital, CMs bridge portions of a design having different characteristics such as voltage level shifts, bus widths, etc. CMs may be automatically inserted or may be inserted by a user, Currently, before CMs can be automatically inserted, nets need to have an assigned discipline (i.e., information as to whether each net is to be simulated as analog or digital must be known).

Verilog-AMS provides an automated process called "discipline resolution" that determines what discipline to assign each net in a design. The discipline resolution process generally proceeds as defined by the standard. Users may also, on a net-by-net basis designate an analog or a digital discipline for nets.

After discipline resolution, a design may be partitioned by insertion of CMs. For example, partitions in the design can be identified by determining which analog nets connect with each other to form an analog island, and which digital nets connect with each to form a digital island. The boundaries between the digital islands and the analog islands are the partitions in the design. The simulator tool will insert CMs at each net that crosses a given partition.

Sometimes, these partitions comport with what the user would have selected had a choice been made by the user. And sometimes, especially for users who may be unfamiliar with AMS, this discipline resolution process produces unexpected results, because some of the nets may have been assigned an analog discipline, when the designer wanted the net to be digital, or vice versa. In other words, the discipline of nets and subsequent partitioning of the design by the tool was not as the user would have desired.

For example, during design verification, verification personnel may assemble blocks, some digital and some analog, of a semiconductor design provided by a number of different designers. These designers may have not have provided disciplines for the nets in their blocks before providing them to verification. In some cases, these blocks may have first been designed with tools that did not have a domain concept, because they were either pure analog or digital tools. For these cases, the verification personnel may either manually modify the design of each block by specifying what domain (or discipline) should be assigned to each net; or the designer may run the tool and allow the tool to automatically determine where to insert CMs to specify how each net should be simulated. If the verification personnel modified the design to specify disciplines on nets, then the design has then been changed by the verification personnel and there needs to be some coordination with the designer of that block to ensure that there is coherency in the design. Where the tool automatically determined the disciplines of nets, the verification personnel would typically review the automatically assigned domains and change (coerce) those that were incorrectly determined. This process can be tedious, especially for nets that cross various blocks in a design.

SUMMARY

A first aspect comprises a computer readable medium comprising instructions for a method of partitioning a mixed signal circuit design for simulation, The method comprises accepting one of an analog discipline and a digital discipline that is associated with a first block of a plurality of blocks of a mixed signal circuit design, The method also comprises, for each domainless net of the first block, determining whether the net has a higher priority source for discipline assignment, and if not, then assigning the accepted discipline to the net.

A second aspect comprises a computer readable medium comprising instructions for a method of partitioning, into analog and digital portions, a mixed-signal semiconductor design specified as an assembly of blocks. The method comprises, without first using a discipline resolution algorithm to resolve domainless nets of one or more blocks in the assembly, identifying boundaries between analog and digital portions at a block level; and indicating that discipline resolution is not to be run on the design.

A third aspect comprises a method embodied in instructions available from a computer readable medium, the method is for partitioning, into analog and digital portions, a mixed signal semiconductor design specified as an assembly of instances of blocks.

The method comprises determining if there is a global selection to identify analog and digital portions, based on information available from the design specification. And if so then indicating that an automated design resolution process is to be skipped; and, for each instance, determining whether the instance is at an analog/digital boundary. If it was determined that the instance is at such a boundary then the method further comprises indicating that nets of the instance crossing the boundary are to have connection modules inserted.

If it is determined that there is no global selection, then the method further comprises determining, for each instance of the design, if there is a user-provided indication that the instance is at an analog/digital boundary. If so, then the method further comprises indicating that nets crossing that analog/digital boundary from the instance are to have connection modules inserted, and indicating that the automated design resolution process is to be skipped for the instance.

If there is no such user-provided indication for the instance then, for the instance, the method further comprises determining whether there is a user-provided indication that all domainless nets of the instance are to be assigned either a digital or an analog discipline. If so then the method further comprises assigning such discipline to each domainless net in the instance; and running the automated design resolution process for assigning a discipline to remaining domainless nets in the design that are not within instances for which discipline resolution was indicated to be skipped.

Such aspects may include a method of simulating a mixed-signal semiconductor design specified as an assembly of one or more blocks. The method comprises assigning either an analog or a digital discipline to each net of each block, where the discipline assigned to each net determined based on block-level discipline assignments, if available.

And if not available, then the discipline assigned is based a discipline determined by an automated discipline resolution algorithm.

Additional aspects may include a multimode system for partitioning a mixed signal circuit design specified as a plurality of blocks. The system comprises a means for determining whether to operate in a first discipline resolution mode or a second discipline resolution mode. The system also comprises a means to operate in the first discipline resolution mode, the means comprising a means for accepting a discipline associated with a first block of the plurality of blocks, and a means for assigning the discipline to each domainless net of the first block that does not have a higher priority source for discipline assignment. The system also comprises a means to operate in the second discipline resolution mode comprising a means to identify boundaries between analog and digital portions of the mixed signal circuit design without first using a discipline resolution to resolve domainless nets in the plurality of blocks.

BRIEF DESCRIPTION OF THE DRAWINGS

For a fuller understanding of aspects and examples disclosed herein, reference is made to the accompanying drawings in the following description.

FIG. 3 illustrates a second aspect of discipline assignment and circuit partitioning;

DETAILED DESCRIPTION

The following description is presented to enable a person of ordinary skill in the art to make and use various aspects of the inventions. Descriptions of specific systems, techniques, applications, and processes are provided only as examples. Various modifications to the examples described herein will be readily apparent to those skilled in the art, and the general principles defined herein may be applied to other examples and applications without departing from the spirit and scope of the invention.

The following description relates to exemplary methods in which discipline resolution can be controlled by designers to accomplish certain objectives during partitioning a mixed signal design for simulation. These exemplary methods can be used separately and in combination with each other for different portions of a design, including at different hierarchical levels of a design. The following description also includes a method of resolving what partitioning method should control in a particular portion of a particular design. These methods can be implemented in computers that are controllable by instructions available from computer readable media. The computers may include a variety of systems, including general-purpose computers programmed from computer readable media, dedicated hardware or any combination or variation thereof.

As described in the background, existing Verilog AMS simulator systems provide algorithms for automatically assigning disciplines to undeclared nets in a design. An example of such an algorithm is provided for setting context.

Figure 1:
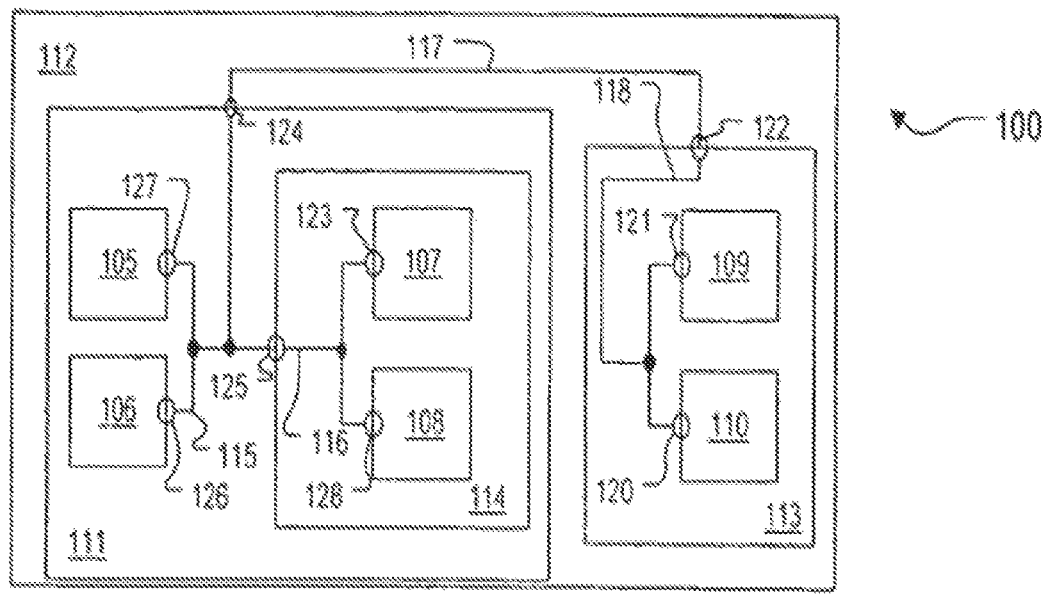
FIG. 1 illustrates a circuit for describing aspects of a Verilog AMS standard method for discipline resolution as well as exemplary aspects of the invention.

FIG. 1 illustrates a block level view of a mixed-signal circuit 100 containing a plurality of blocks. For describing background to inventive methods and other aspects, it is presently assumed that blocks 105, 106, 107, 108, and 109 have nets that are not presently assigned, but should have, a digital discipline, and block 110 has one or more nets that are assigned or should be assigned an analog discipline.

Net 115 connects blocks 105 and 106. Net 116 connects blocks 107 and 108 to a port 125 of a block 114 that contains blocks 107 and 108. Net 115 in turn connects to port 125 from outside block 114. Net 115 also connects to a port 124 at a boundary of block 111 that contains blocks 105-108. Net 118 connects blocks 109 and 110, and also connects to a port 122 of a block 113 that contains blocks 109 and 110. Net 117 connects nets 115 and 118 by connecting to each of ports 124 and 122. In this example, ports, a.k.a. terminals, are logical entities that demarcate a logical connection between different blocks in a circuit, but need not represent circuit elements in a physically realized circuit. Blocks 111, 113, and 114 may also contain other circuitry that is not part of any previously identified block (i.e., is not within another layer of hierarchy in the design).

The above-described circuit may be specified, for example, by assembling Verilog code for each of blocks 105-109 and SPICE code for block 110. In conventional Verilog-AMS simulation, the simulator would assign a discipline to each net not already having a discipline assigned to it.

Presently, there are several algorithms that Verilog-AMS may use to assign disciplines to unassigned nets. One such algorithm is called detailed discipline resolution, and the operation of that algorithm on the circuit described above is described below, with the assumption that there are no out of module discipline declarations provided by the user for any of the above-listed nets.

One principle applied in the detailed resolution algorithm is that analog (continuous) nets propagate up from lower layers of hierarchy to higher layers, while digital disciplines do not propagate. Another principle applied is that as between a digital net and an analog net that meet at a node or port, the analog discipline takes precedence, meaning that analog disciplines will also travel from higher levels to lower levels in the hierarchy of a circuit. Note that this process thus generally requires multiple traversals of the hierarchy for a given design, which increases the time required to implement verification and simulation, particularly of large circuits.

For describing the detail discipline resolution algorithm of the standard, it is assumed that a net internal to block 110 is assigned an analog discipline. by the user, because the user desires to simulate this net as an analog net. The analog discipline of that net connected to port 120 causes net 118, which is also connected to port 120 to be assigned an analog discipline. Because net 118 is analog, and connects to port 122, the nets that connect to port 122 will also be assigned an analog discipline. Therefore, net 117 will also be assigned an analog discipline. Net 117 terminates at port 124 to which net 115 connects. Therefore, net 115 will be assigned an analog discipline. Net 115 connects to ports 125, 126, and 127. Any nets also connected to those ports and not assigned a discipline will also be assigned an analog discipline, including net 116. Which in turn connects to ports 123 and 128, and propagates the analog discipline to unassigned nets in blocks 107 and 108.

As can be seen, even though it was given that many of the function blocks of the design in FIG. 1 were digital blocks, all the interconnects, even interconnects that connecting digital blocks to other digital blocks, were assigned an analog discipline because of the one port that initially had an analog discipline. Such behavior may be entirely unexpected, especially among users who are unaware of AMS discipline resolution algorithms.

Some of the following description describes settings and commands provided to the simulator system, Such settings and other inputs provided to the simulator in the following examples are generally referred to as indications. Also, such indications may be user selectable at run-time, or they can be machine generated or obtained by prompting a user. These indications may also be recorded or otherwise provided in a variety of scripts or other configuration files. For example, these indications may be included in an Options Specification Format file, in environment variables, or in any flow-based intermediate specification.

Skip DR/Direct CM

Figure 2:
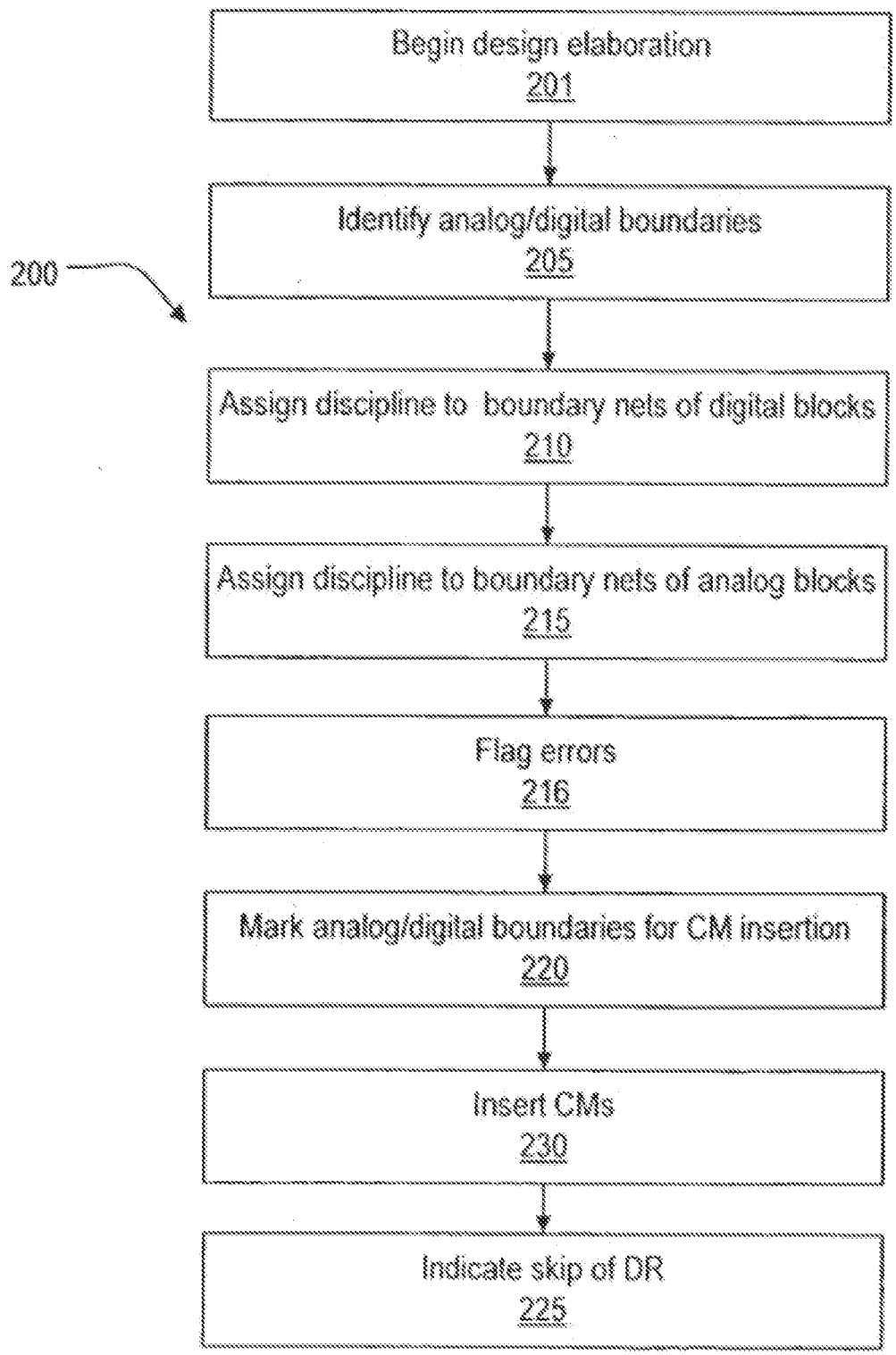
FIG. 2 illustrates a first aspect of discipline assignment and circuit

FIG. 2 illustrates a first example method 200 that provides users further control and a more intuitive approach to discipline resolution and design partitioning. Method 200 may be most appropriate for a situation where a user is assembling blocks of circuitry that are each known to be either completely digital or analog. For example, in some cases, there may be SPICE sub-blocks of a Verilog block, or Verilog sub-blocks in a SPICE block. These blocks may have been pre-existing, from different sources, and designed by different people or even different companies.

Thus, for illustrating method 200 of FIG. 2, the following assumptions are made regarding the composition of the circuit 100: each of blocks 105-108 are specified using Verilog modules, and are contained within a Verilog block 111. Also, block 110 is, for example, a SPICE-defined block, and is contained within a SPICE block 113. Thus, blocks 110 and 113 are analog blocks, and block 109 is a digital block embedded in analog block 113. All of these blocks are contained within block 112, which for this example is a Verilog module. Also, it is assumed, as is typically the case, that nets in each of the blocks are not yet assigned disciplines.

In the present example, these blocks, in the conventional Verilog-AMS flow, would require discipline resolution before simulation because their nets are. not all assigned a discipline. Here, because there are analog blocks in the circuit and because analog net assignment generally takes precedence over digital assignment, there is a good chance that the discipline resolution algorithm would assign analog disciplines to nets in the digital blocks that are connected to analog nets. To a user assembling this circuit for simulation, this resolution may be both unintended and undesirable. Moreover, in the typical situation of a much more complex circuit, it would be difficult to predict ex ante what the result of discipline resolution will be.

Therefore there is provided a setting selectable by a user that allows discipline resolution algorithms to be turned off for the entire circuit 100. However, because analog/digital partitions need to be marked with CMs before simulation, there is also provided a way to automatically identify such partitions.

In the present example, the blocks of circuit 100 were assembled from identifiable sources, i.e., the blocks are identifiable by virtue of their being either created in Verilog or SPICE code, or some other design specification language(s) (for the methods described herein, such languages can include SystemC, VHDL, and SystemVerilog, for example), or are otherwise blocks that the user desires to be simulated entirely as digital or analog. For such blocks, a boundary of each block is identifiable from the block specification itself, which generally includes a description of the input and output signals for each block.

So, when the user selects the setting to turn off discipline resolution, the system thereafter begins design elaboration (201) by identifying analog blocks and digital blocks based on the type of each block (205). The system also identifies nets of analog blocks that each have a connection to a digital block, and assigns those nets an analog discipline (215), and identifies nets of digital blocks that each have a connection to an analog block, and assigns those nets a digital discipline (210). In other words, for steps 210 and 215, the system assigns disciplines at least to boundary nets of each digital and analog block; the system may optionally assign disciplines to nets internal to each block. The system marks each junction between an analog and a digital discipline for CM insertion (220). The system can insert a CM (230) at each such junction according to standard CM insertion protocol, as well as indicate that discipline resolution according to standard AMS methodologies need not be conducted (225).

Because method 200 of FIG. 2 involves automatic determination of analog/digital partitions, a system implementing method 200 may also have contradictory information inputted from other sources. For example, a user of system 200 may have previously defined, through a simulation tool implementing method 200, various disciplines for nets, or terminals in the design. These definitions may still exist, and would be flagged as errors in step 216 to allow the user to determine an appropriate resolution.

With particular regard to FIG. 1, block 110 is an analog block that is in analog block 113 and therefore requires no CM. However, block 109 is digital and in analog block 113. Therefore, the system identifies the net internal to block 109 that connects to net 118 and assigns that net a digital discipline, and likewise assigns an analog discipline to net 118.

Similarly, net 118, now assigned an analog discipline and within block 113 connects at port 122 with net 117, which is in digital block 112. Thus, net 117 is assigned a digital discipline.

There are now two places in circuit 100 where an analog discipline net meets a digital discipline net—at port 122 and at port 121. The system inserts a CM at each location. Since the remainder of the design includes digital blocks interfacing with other digital blocks, no connection modules are required at the interfaces for these blocks. For these purposes, it is said that the system inserts a CM; however, the system can simply mark or otherwise indicate that a CM is to be inserted at the location, rather than inserting the CM at this point. In this context, inserting a CM refers to interrupting the previously electrically connected nets with the CM such that the nets communicate through the CM.

After identifying such partitions, the system also indicates that discipline resolution need not be run on the design because the boundaries between analog and digital partitions have been identified as described above. By avoiding discipline resolution in complex designs significant time savings may be realized. Also, the user will intuitively know precisely where the boundaries between analog and digital portions are, by contrast with conventional discipline resolution algorithms where analog signals may propagate into digital portions, causing insertion of CMs at unexpected locations deep within a hierarchy of digital blocks.

For nets internal to each block, the system need not, but can assign appropriate disciplines to those nets, For example, the system need not assign a digital discipline to nets 115 or 116, but can be configured to do so, if desired.

An example command to indicate application of method 200 includes:—disres "none"—discipline logic1, This command would cause assignment of logic1 to nets identified as being within a digital block and connecting to an analog block.

Figure 3:
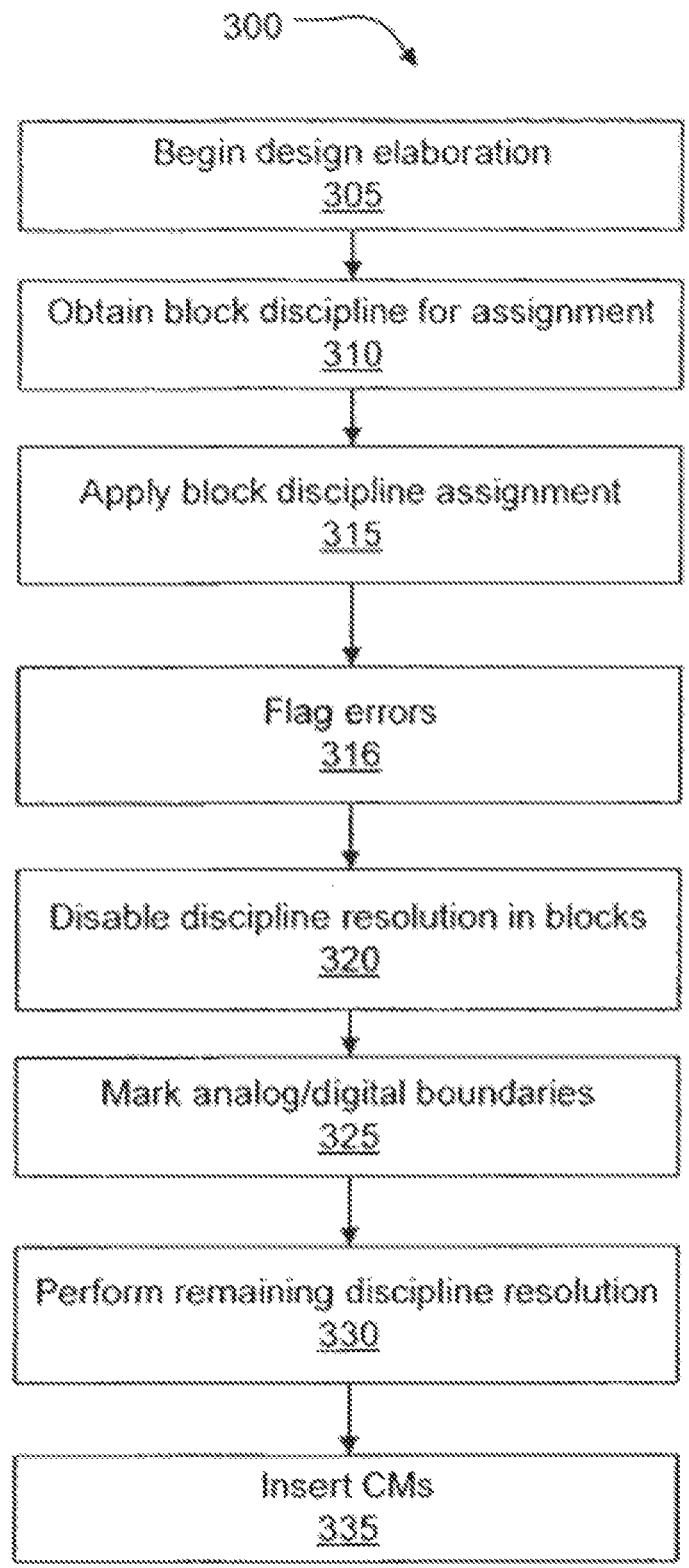
FIG. 3 illustrates a second aspect of discipline assignment and circuit

This method of disabling design resolution and relying on information contained in the design specifications for the blocks themselves to identify partitioning locations can also be applied to only a portion of a design. FIG. 3 illustrates a block-based partitioning method in which the method of FIG. 2 could also be used in a portion of the design.

PARTIAL DR/DIRECT CM

In this example, the block-based circuit 100 is again used in describing method 300 of FIG. 3, with the following assumptions as to the composition of circuit 100. It is assumed that block 111 has analog portions, block 114 is a block that contains mostly digital logic, excerpt for block 107, which is assumed to be an analog block.

Figure 6:
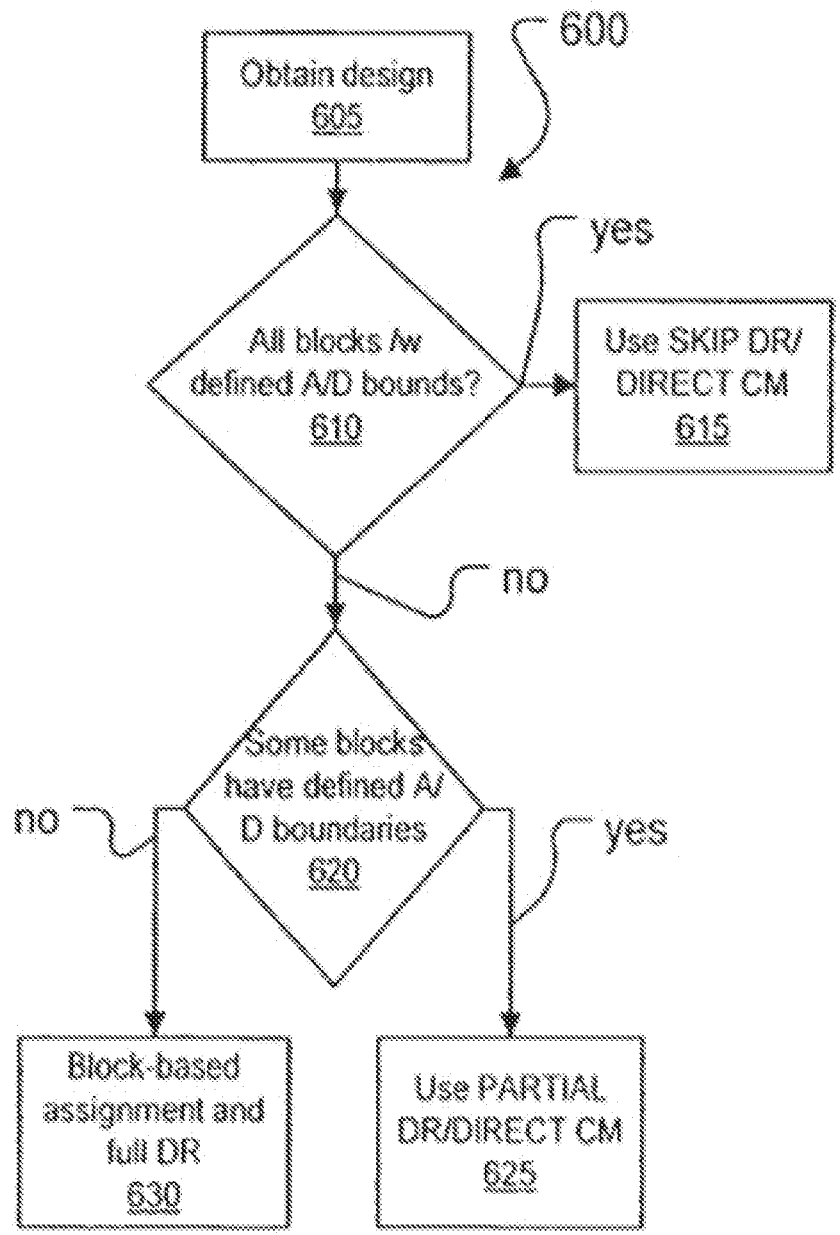
FIG. 6 illustrates a flow chart for selecting one or more of the aspects for use in partitioning and discipline resolution for a particular circuit.

Generally, the system would accept an indication that all unassigned nets of block 114 are to be assigned a digital discipline, This indication may be provided by a user, may be generated according to the method of FIG. 6 by the system, or the system may assist the user in implementing the method of FIG. 6 through prompts or the like. In situations where there are sub-blocks that are analog blocks, such as block 107 in this example, these analog blocks can be separately identified in the system, For example, an indication can be made available to the system, which indicates that all unassigned nets of block 107 are to be assigned an analog discipline. As will be described in further detail with regard to FIG. 6, the more specific command to assign analog disciplines to unassigned nets of block 107 takes precedence over the more general command to assign digital disciplines to all unassigned nets of block 114, which hierarchically includes block 107. As such, accepting an indication for assigning a discipline would include receiving data embodying the indication at the system executing the method. The system would then record data representative of the indication in a data structure or other suitable mechanism that may be referenced at a time appropriate for assigning the indicated discipline.

Method 300 includes step 305 of beginning design elaboration. Design elaboration comprises obtaining specifications for the blocks involved from. various libraries and hierarchically associating them as they are in the particular design, e.g., circuit 100.

Method 300 also comprises step 310 of obtaining the block discipline commands described above for blocks 114 and 107. At 315, the system applies the indicated discipline assignment to the unassigned nets of the respective blocks. Thus, the system assigns analog disciplines to unassigned nets of block 107 and digital disciplines to unassigned nets of block 114, as well as block 108, which is hierarchically included within block 114 and is not associated with a more specific assignment, as was block 107. At step 316, the system may also flag as an error any net labeled with a discipline contrary to the discipline being assigned to nets of a particular block. For example, if there was a net with an analog discipline in block 114; for which unassigned nets were receiving digital disciplines, then that net would be flagged as an error.

At 320, the system indicates that there should be no discipline resolution process for any of blocks 114, 107 and 108 (either by individually indicating such for each block, or simply by indicating that block 114 and any block hierarchically within block 114 is to be excluded from discipline resolution.)

Since DR was disabled in these blocks, by indicating that all unassigned nets in block 114 be assigned digital disciplines, this indicates to the system that there is a digital/analog partition between analog block 111 and digital block 114. Likewise, indicating that unassigned nets of block 107 are to receive analog discipline assignments indicates to the system that a digital/analog partition exists between block 114 and block 107. Therefore, after effecting such assignments, the method includes marking those analog/digital boundaries at step 325 for insertion of CMs.

Method 300 includes step 330, which includes performing discipline resolution on the remaining blocks of FIG. 3, which are block 112, which includes block 111, excepting block 114 and blocks within block 114, and block 113 and all blocks therein. After such discipline resolution, additional locations for insertion of CMs are identified based on analog/digital disciplines meeting each other, as described with respect to FIG. 2. At 335, CMs can be inserted at all identified locations.

An example format that may be appropriate for a script or by entry into a command line interface for indicating application of PARTIAL DR/DIRECT CM to a block in the design are as follows:

-setdiscipline no_dr inst-112,114-logic1. This command indicates that DR is not to be run, and that block 114 gets an instance-based discipline assignment of logic1 such that this discipline will be assigned to all unassigned nets in block 114.

-setdiscipline no_dr cell-function1-analog1. Assuming that the block 111 is an instance of the cell function1, then this command indicates that DR is not to be run, and that block 111 gets a cell-based discipline assignment of analog1, such that this discipline would be assigned to all unassigned nets in block 111, as well as blocks hierarchically within block 111, unless there is a more specific assignment for any such blocks. Note that here, if the immediately previous command were also given for block 111, then that command would provide a more specific assignment for the unassigned nets of block 111, and would be used.

Block-Based Assignment/Full DR

A final example of a method for aiding in block level control of design partitioning may be considered a variation of what was described with respect to FIG. 3. A principal distinction between that method and the present method is that the system interprets an indication by the user that all unassigned nets in particular block(s) of a circuit are to be assigned either a digital or an analog discipline. However, rather than immediately identifying the specified block as entirely belonging to a particular domain, identifying the boundary of that block as a digital/analog partition, and marking nets crossing such boundary for insertion of CMs, the present method continues by conducting discipline resolution on the remaining portions of the circuit prior to identification of analog/digital partitions. Thus, all unassigned nets of the circuit then have a discipline assigned, and a normal algorithm for determining analog/digital boundaries can be run, and CMs inserted at those identified boundaries.

However, it is also assumed that the user of the simulator desires to simulate unassigned nets of block 107 using an analog simulator (e.g., to better understand signal slope on the nets).

Figure 4:
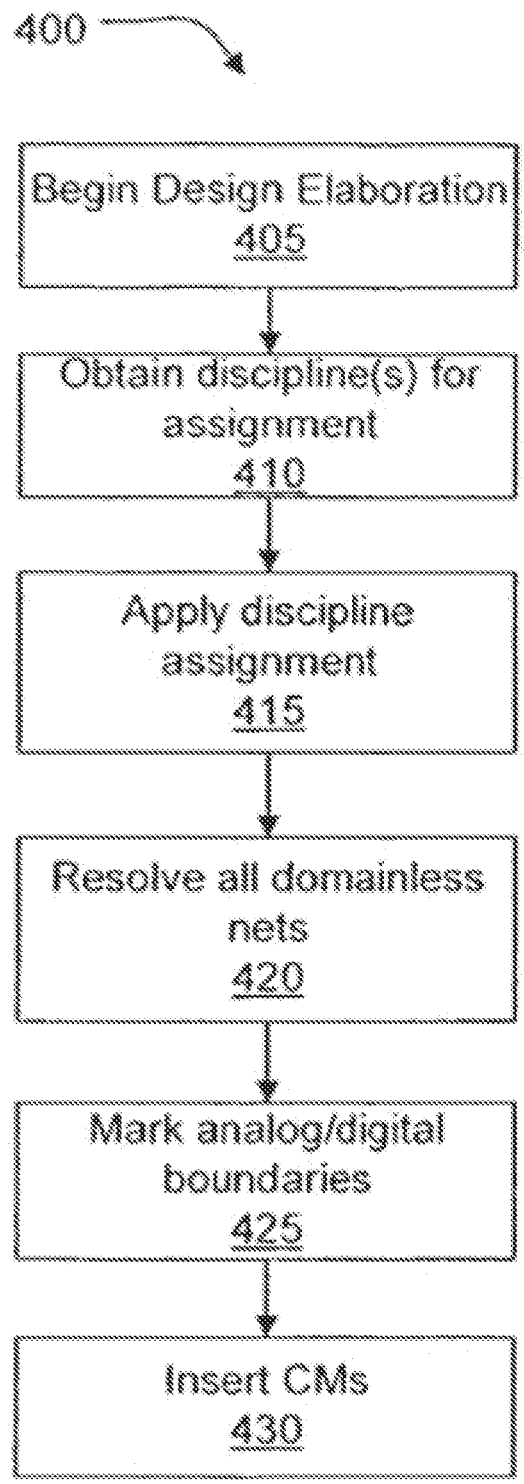
FIG. 4 illustrates a third aspect of discipline assignment and circuit partitioning.

By particular example, FIG. 4 illustrates a method 400 having steps including step 405 of beginning design elaboration, which was described above with respect to FIG. 3. Step 410 includes obtaining discipline assignment(s) that can be for blocks as well as terminals and ports. These assignments can be obtained, as described above. An example command that indicates usage of the method may be formed as follows:—setdisdpline—cell-function2-logic1, where for example, block 114 is an instance of cell "function2." This command indicates that unassigned nets in block 114 will receive the discipline logic1.

At step 415, the discipline provided are assigned to nets without an assigned discipline in the block to which the discipline assignment pertains. After applying each block discipline assignment to unassigned nets in each block for which a discipline assignment was received, the method at 420 resolves remaining domainless nets in the circuit 100. This resolution can proceed, for example, according to standard Verilog AMS discipline resolution algorithms.

By contrast with the previous method, the present method preferably does not identify as erroneous nets that have a discipline assigned that is different from the one provided in the command. This is so because this mode accounts for situations where a user desires to have particular nets in a block that may be particular discipline assignments based on known simulation needs. As such, this mode may be considered a more advanced mode of operation appropriate for those more familiar with Verilog AMS.

After completion of step 420, the method at 425 continues by identifying partitions by identifying where analog and digital nets meet, and indicating that those meeting points are to have CMs inserted (430).

The above exemplary methods for partitioning and resolving discipline nets in circuit 100 can be mixed and matched with each other by application to different portions of a design. Also, according to aspects described with respect to FIG. 5A, methods and systems may be: provided to resolve which method to apply to a given portion of a design where multiple such methods may be applicable.

Reconciling Methodologies

Figure 5A:
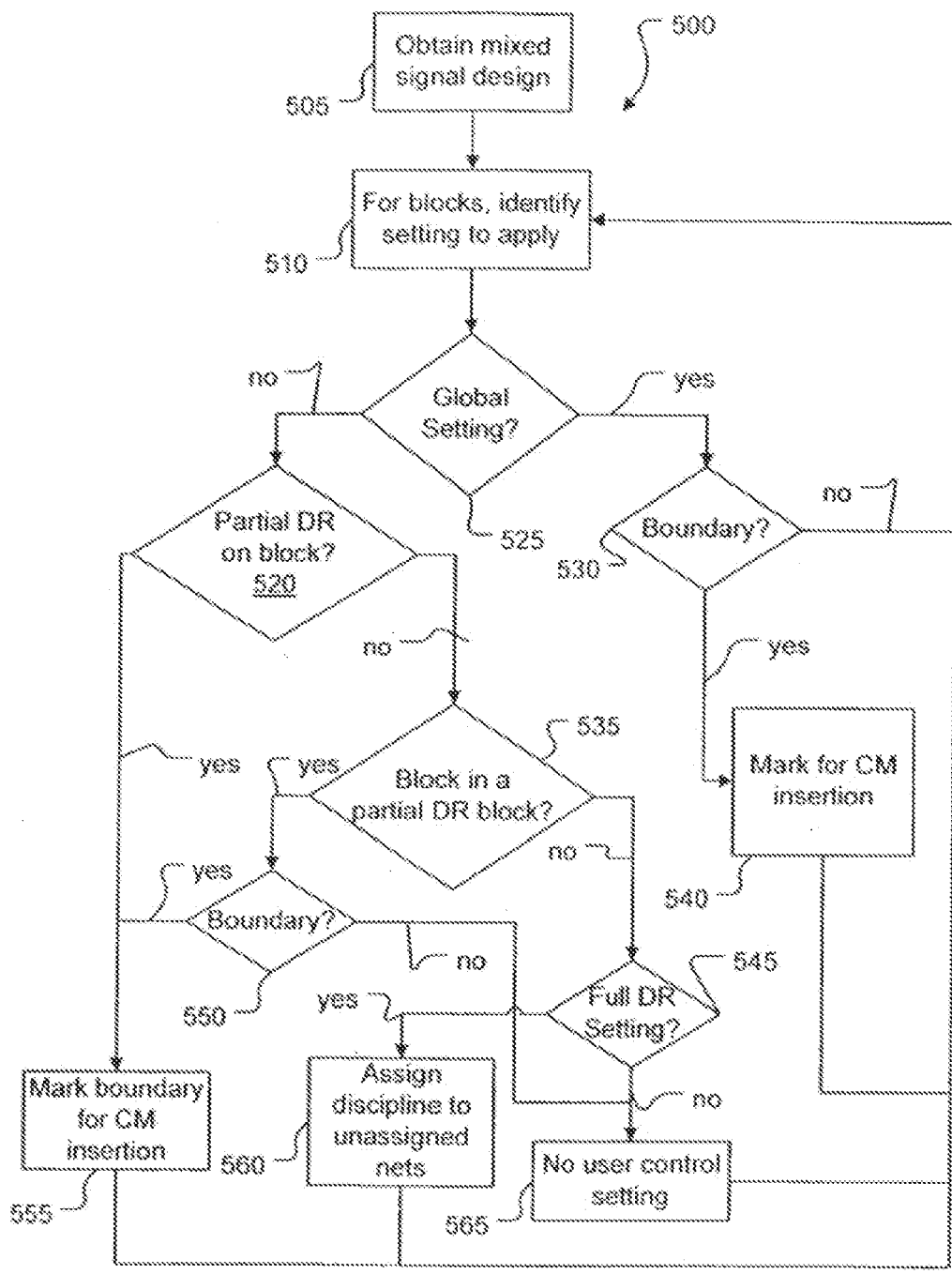
FIG. 5A illustrates a method for applying the above aspects during partitioning of a circuit for simulation.

FIG. 5A illustrates an example method 500 for resolving which of the methods described with respect to FIGS. 2-4 to apply to a portion of a design, such as circuit 100 (FIG. 1). Exemplary method 500 illustrates a method proceeding according to individual blocks in the design; however, other methods for resolving which setting to apply to a block are possible.

In 505, the method obtains a mixed signal design specification, such as a specification for circuit 100. In 510 (described in more detail in FIG. 5B), the method may receive some or all of the user-provided block or global based settings and commands described with respect to FIGS. 2-4. Alternatively, the block based settings or commands can be obtained or otherwise accessed when they need to be referenced for determining what to do for a particular block in the design, in this block-by-block method.

Figure 5B:
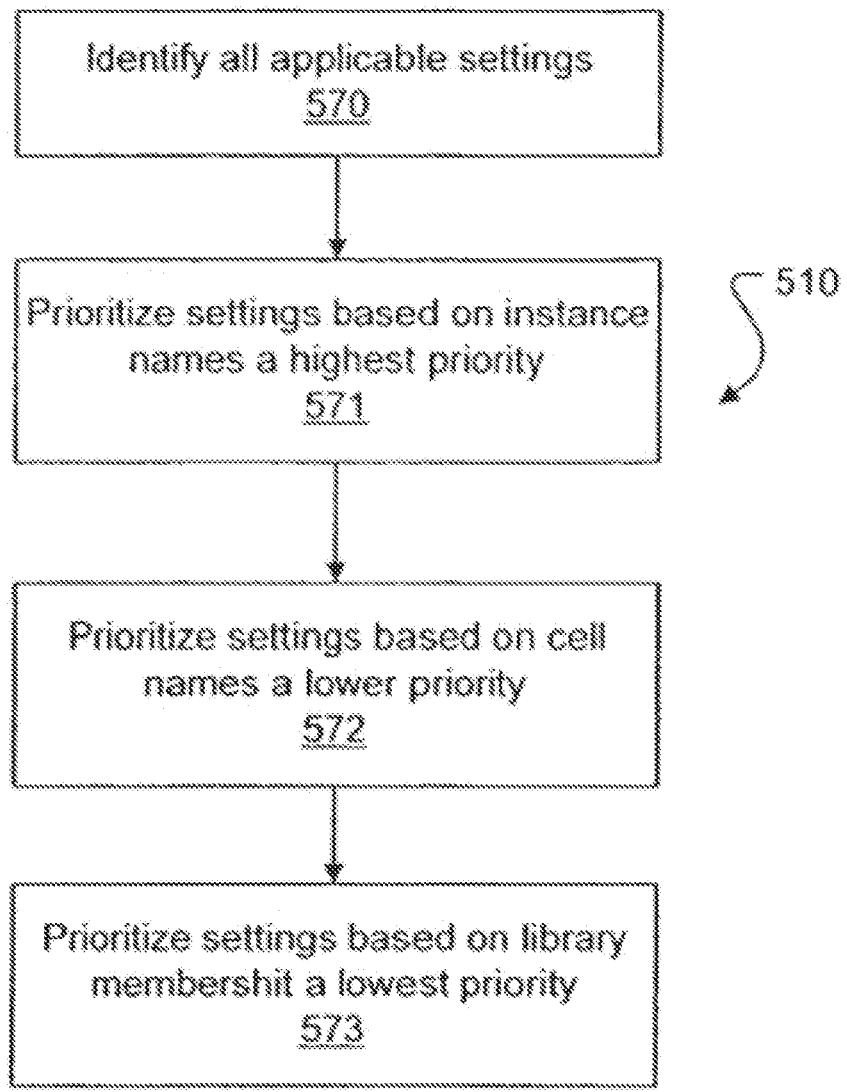
FIG. 5B illustrates steps of prioritizing settings applicable to a given block during circuit partitioning.

Thus, at step 510, the setting to be applied to that block is identified (see FIG. 5B). First, at 525, it is determined whether there is a global setting to skip design resolution applicable to that block. The present exemplary method provides for overriding other settings that may be associated with that block. If there is a global setting, then the method at 530 determines whether the block contains any boundary between an analog and digital block. Exemplary ways to make this determination were described with respect to FIG. 2, and include identifying analog and digital blocks based on a design language used to specify each block, and then identifying nets that connect analog and digital blocks. The method then marks or otherwise indicates that nets between analog and digital blocks are to have a CM inserted.

If there is no global setting for the block at issue, then the method at 520 determines whether there is a partial DR/direct CM setting directly associated with the block (i.e., a command indicates that this block, and not a hierarchical parent to this block has this setting). If so, then the block is considered to be an analog/digital boundary and nets connecting the block to other blocks are marked for CM insertion.

If there is no partial DR/direct CM setting directly associated with the block, then it is determined at 535 whether the block is hierarchically within a block having a partial DR/direct CM setting associated with it, and as such also associated with that setting.

If so, then method 500 determines at 550 if the block is a boundary by determining whether the block is an analog block and if so then determining whether the block to which the partial DR applies is not an analog block (i.e., the block is within a partial DR block, and if the block is an analog block while the partial DR block is digital, then step 550 identifies the block as a boundary) and marks at step 555 the boundary for insertion of CMs.

If the block is not in a partial DR block (no at 535), then the method 500 proceeds to check at 545 whether there is a FULL DR setting applicable to the block. If not, then there is no applicable setting on the block for the system to handle, and method 500 returns to 510 for consideration of another block.

if there is, then at 560, the system assigns the discipline provided with the FULL DR setting to the unassigned nets in the block and thereafter returns to 510.

FIG. 5B illustrates steps contained within step 510 of FIG. 5A. FIG. 5B thus illustrates an exemplary procedure for determining what setting should apply to a block of the design. Step 510 includes gathering all the possible settings that can apply to the block under consideration. These settings can come from settings applied at an instance level, at a cell level, and at a library level, for example. FIG. 5B exemplifies the prioritization (571) of settings applied to a particular instance of a cell over settings applied to the cell and settings applied to a library of which the cell is a member. FIG. 5B also exemplifies priorization (572) of settings applied to a particular cell over settings applied to a library of which the cell is a member. Finally, FIG. 5B also includes prioritizing (573) settings applied to the library as a lowest priority of the three listed. Of course; step 573 can be a default/lowest priority and need not be specifically applied. Likewise, ordering could be reversed such that priorities are assigned based on lowest to highest with a highest priority being a default.

Choosing Methodologies

With the increased versatility of the above described methods, a user of a system implementing such methods may consider a variety of circumstances in determining which method or methods to employ in simulating a particular design or a portion thereof.

The method of FIG. 6 illustrates how a determination can be made to employ a particular methodology in simulation of a design. This method will be discussed in the context of an entire design, but it also applies to portions of a design and could be performed therefore numerous times for simulating one circuit.

At step 605, a design configuration is obtained or otherwise made available to the simulator. At step 610, it is determined whether the design has digital blocks with analog sub-blocks inside the digital blocks, or analog blocks with digital sub-blocks. If so, then the blocks can be considered to have well-defined analog/digital boundaries, and at step 615, it is determined that SKIP DR/DIRECT CM is an appropriate setting to use in simulating the design, and that setting may therefore be specified on such blocks in the design, as described above.

If it is determined that the design does not meet the criteria of step 610, then at step 620, it is determined whether portions of the design are expected to have well-defined analog/digital boundaries. If so, then at step 625, it is determined to use PARTIAL DR/DIRECT CM in the design, as described above. if not, then the design has blocks that cannot be categorized as either analog or digital. Hence at 630, it is determined that the simulation may be helped by assigning of disciplines on a block-by-block basis, or at a terminal (port) or net level, as derived from settings provided in the simulation tool, outside of the source specifications of the blocks. Thereafter a FULL DR PERF setting may be used to resolve the disciplines of some of the nets in the design, as this design would be deemed to have ill-defined analog/digital domain boundaries. Finally, CMs may be inserted according to the standard methodology based on the design as partitioned into domains.

Means for implementing the various steps of the methods described may include computer code written to execute such method steps as well as associated resources such as one or more data structures for storing the circuit design specifications, configuration information, intermediate results, and output products. Such means also generally includes one or more ways to interact with system users to accept indications or other information as described above, as well as means to display results or to further query for more information as well as for displaying error messages or inquiries for further information as appropriate. Aspects of a physical implementation are described below.

Figure 7A:
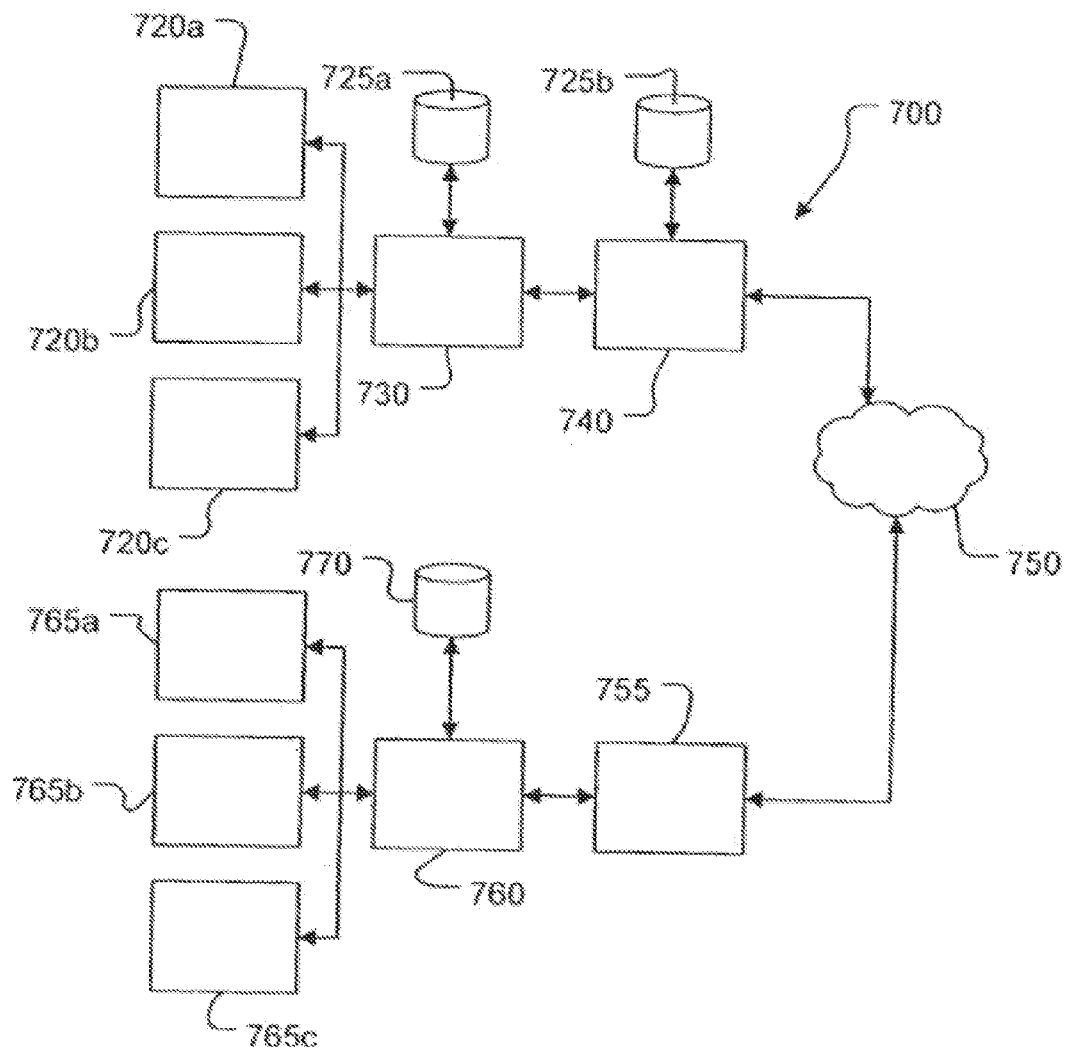
FIG. 7A illustrates a system that may embody implementations of any and all of the methods described above.

Now turning to FIG. 7A, there is described a system 700 in which all of the above methods or selections thereof may be implemented, and are therefore a means for implementing the above methods. System 700 comprises a plurality of computers 720a-c that may include user nodes, such as workstations, personal computers, or terminals connecting with a larger more centralized computer for processing capacity. Computers 720a-c may also include servers, such as racks of servers in a dataroom. An example computer 720a is described with respect to FIG. 7B. Computers 720a-c may connect to a Local Area Network (LAN), by for example, connecting with a switch 730. The LAN may be implemented with copper connections, fiber, or wirelessly, and may operate at any of a variety of speeds, for example the LAN may be a copper gigabit Ethernet network. Computers 720a-c may have multiple network connections.

Switch 730 may also connect with a Network Attached Storage (NAS) 725a that may store information including design specifications, cell libraries, simulator code, and the like. NAS 725a may be accessible by computers 720a-c. Switch 730 in turn communicates with a router 740 that may connect over a private network or dedicated link to storage medium 725b. Router 740 connects over a Wide Area Network, including using the Internet, and various types of private networks, or leased lines, to a router 755 for a second local area network that includes switch 760 which connects with a NAS 770. Switch 760 networks computers 765a-c which may also include user interface points as well as servers able to accept jobs for processing.

Figure 7B:
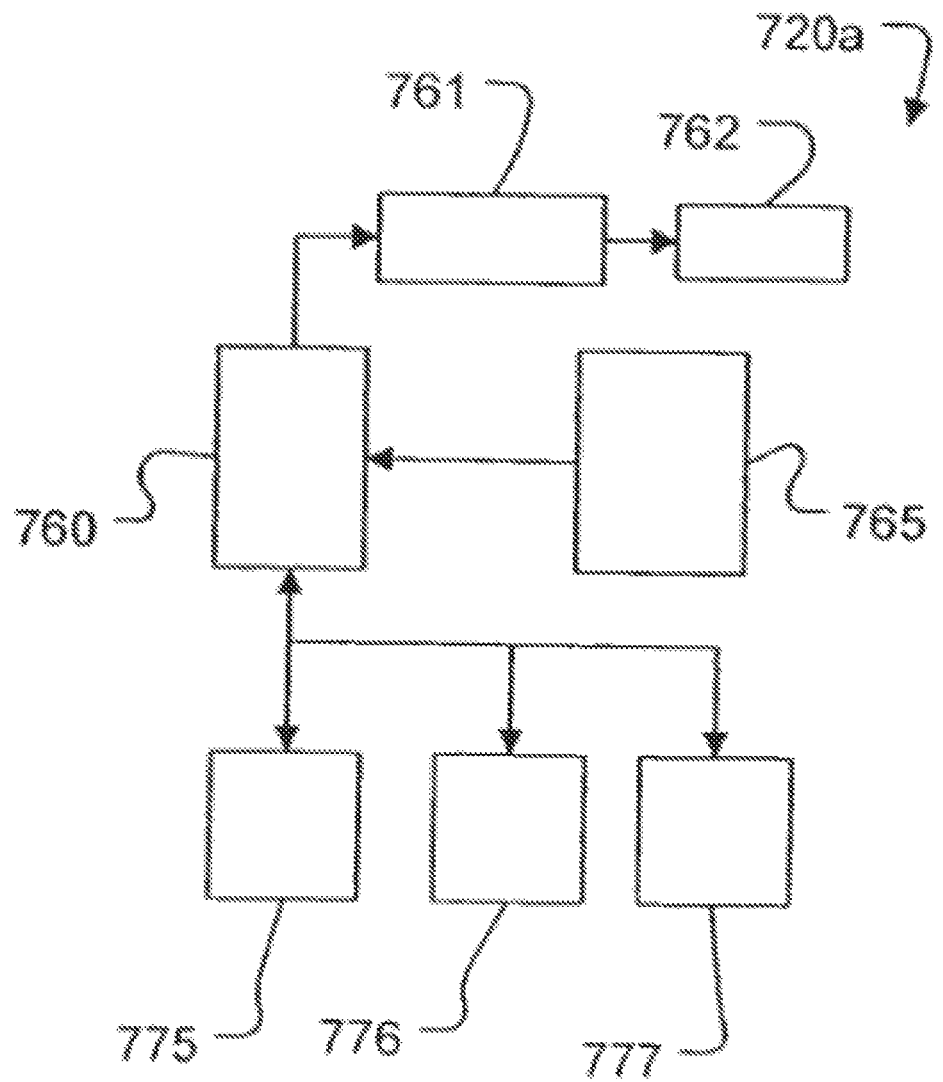
FIG. 7B illustrates a system that may embody implementations of any and all of the methods described above.

FIG. 7B illustrates an example computer 720a that includes a central processing unit (CPU) 760 communicating with storage 775, network port 776, and I/O 777. User interface 765 may comprise keyboards, mice, voice recognition and other interfaces. Storage 775 may comprise hard-drives, solid state drives, and removable media including DVD, CD, as well as removable storage media interfacing with USB or IEEE 1394 interfaces, for example. The CPU outputs data for display through display controller 761 to display 762.

Any of the above described storage devices and memories, including 725a, 725b, 770, and 775; are or can accept suitable computer readable for storing instructions for methods according to aspects described herein.

This description is exemplary and it will be apparent to those of ordinary skill in the art that numerous modifications and variations are possible. For example, various exemplary methods and systems described herein may be used alone or in combination with various simulation systems and methods known to those of skill in the art. Additionally, particular examples have been discussed and how these examples are thought to address certain disadvantages in related art. This discussion is not meant, however, to restrict the various examples to methods and/or systems that actually address or solve the disadvantages.

The invention claimed is:

1. A non-transitory computer readable medium comprising instructions for a method of partitioning a mixed-signal semiconductor design for simulation, the design an assembly of one or more block specifications, each block specification generated by one or more design tools, each design tool referencing respective block netlists for the block specifications generated, the method comprising:

assigning, in a tool copy of the block specifications and without modifying the netlists for the block specifications, either an analog or a digital discipline to each net of each block, the discipline assigned to each net determined based on block-level discipline assignments, if available, and if not available, then based on an automated discipline resolution algorithm.

2. The computer readable medium of claim 1, wherein the block-level discipline assignment applies to a particular cell of a library of cells.

3. The computer readable medium of claim 1, wherein the block-level discipline assignment applies to a block that hierarchically includes instances of a plurality of cells, and the step of assigning includes assigning that discipline to each net of each instance, in the absence of a more particular source for a net's discipline.

4. The computer readable medium of claim 1 wherein the block-level discipline assignment applies to a block that includes instances of a plurality of cells, and further comprising determining that an instance has been associated with a discipline assignment, and using the discipline associated with that instance, rather than the block-level discipline assignment, for assigning a discipline to each net in that instance.

5. The computer readable medium of claim 1 further comprising assigning disciplines to one or more terminals of a cell or instance, the disciplines specified through a settings obtained through a simulation tool, and not from the netlists.

6. The computer readable medium of claim 1, wherein the block-level discipline assignment is obtained from a library setting, and is applicable to all cells in that library.

\* \* \* \* \*

UNITED STATES PATENT AND TRADEMARK OFFICE
CERTIFICATE OF CORRECTION

PATENT NO. : 8,640,073 B2  Page 1 of 1
APPLICATION NO. : 13/898007
DATED : January 28, 2014
INVENTOR(S) : Chandrashekar L. Chetput, Abhijeet Kolpekwar and Srinivasan Iyengar It is certified that error appears in the above-identified patent and that said Letters Patent is hereby corrected as shown below:

On the Title Page, under (72) Inventors, the third inventor should be listed as --Srinivasan Iyengar--.

In the Drawings:

On Sheet 6 of 9, in Figure 5B, in Reference Numeral 573, line 2, delete "membershit" and insert --members with--.

In the Specification:

In col. 11, line 11, delete "priorization" and insert --prioritization--.

Signed and Sealed this
Twenty-ninth Day of July, 2014

Michelle K. Lee
*Deputy Director of the United States Patent and Trademark Office*